United States Patent [19]
Bonneau et al.

[11] Patent Number: 5,928,619
[45] Date of Patent: *Jul. 27, 1999

[54] COMPOSITION BASED ON CERIC OXIDE, PREPARATION AND USE

[75] Inventors: Lionel Bonneau, Angliers; Michele Pijolat, La Talaudiere; Olivier Touret, Aubervilliers, all of France

[73] Assignee: Rhone-Poulenc Chimie, Courbevoie Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,507

[22] Filed: Jul. 7, 1997

Related U.S. Application Data

[63] Continuation of application No. 08/120,756, Sep. 15, 1993, abandoned.

[30] Foreign Application Priority Data

Sep. 15, 1992 [FR] France .................................. 92 10953

[51] Int. Cl.⁶ ..................................................... C01F 17/00
[52] U.S. Cl. .......................... 423/263; 423/593; 423/594; 423/595; 423/617
[58] Field of Search ....................... 106/439; 252/181.6; 502/304; 423/593, 595, 617, 263, 594

[56] References Cited

U.S. PATENT DOCUMENTS

| | | | |
|---|---|---|---|
| 3,951,867 | 4/1976 | Howell | 252/462 |
| 4,231,893 | 11/1980 | Woodhead | 252/313 R |
| 4,714,694 | 12/1987 | Wan et al. | 502/304 |
| 4,798,819 | 1/1989 | Lewis et al. | 502/304 |
| 4,859,432 | 8/1989 | David et al. | 423/21.1 |
| 4,940,685 | 7/1990 | Sauvion et al. | 502/263 |
| 5,013,705 | 5/1991 | Koberstein et al. | 502/262 |
| 5,080,877 | 1/1992 | Chane-Ching et al. | 423/263 |
| 5,280,002 | 1/1994 | Bonneau et al. | 502/202 |
| 5,607,892 | 3/1997 | Chopin et al. | 502/304 |
| 5,626,826 | 5/1997 | Chopin et al. | 423/213.2 |
| 5,643,543 | 7/1997 | Guibard et al. | 423/213.5 |
| 5,688,439 | 11/1997 | Chopin et al. | 252/309 |

FOREIGN PATENT DOCUMENTS

| | | | |
|---|---|---|---|
| B-28264/92 | 6/1993 | Australia | 423/263 |
| 205102 | 12/1986 | European Pat. Off. . | |
| 207857 | 1/1987 | European Pat. Off. . | |
| 396159 | 11/1990 | European Pat. Off. . | |
| 2571981 | 4/1986 | France . | |

OTHER PUBLICATIONS

Moeller *Inorganic Chemistry, An Advanced Textbook* by John Wiley & Sons, Inc. USA, pp. 220–221, Library of Congress Catalog Card No. 52–7487, Apr. 1954.

Grant et al. *Chemical Dictionary* McGraw–Hill Book Co. USA pp. 549–550 (5th Edition) ISBN 0–07–024067–1, 1987.

*Primary Examiner*—Gary P. Straub
*Assistant Examiner*—Timothy C Vanoy
*Attorney, Agent, or Firm*—Burns, Doane, Swecker & Mathis, L.L.P.

[57] ABSTRACT

The invention relates to new compositions based on ceric oxide having an improved oxygen storage capacity, these compositions being characterized in that they contain, besides ceric oxide, at least one oxide of another metallic element M chosen from the group consisting of iron, bismuth, nickel, tin and chromium or one of their mixtures, this oxide preferably being in solid solution with the above-mentioned cerium oxide. The process of synthesis of these compositions consists in first of all preparing an intimate mixture between (i) a ceric oxide or a ceric hydroxide and (ii) at least one additive consisting of a hydroxide or a salt, thermally decomposable to an oxide, of the metallic element M, and in then calcining this mixture so as to obtain the desired composition based on oxides. The compositions according to the invention are particularly useful in the manufacture of catalysts and/or catalyst supports, especially those intended for treating exhaust gases from internal combustion engines.

17 Claims, No Drawings

COMPOSITION BASED ON CERIC OXIDE, PREPARATION AND USE

This application is a continuation of application Ser. No. 08/120,756, filed Sep. 15, 1993, now abandoned.

The present invention relates to a new composition based on ceric oxide. It more particularly relates to a composition based on ceric oxide having an improved oxygen storage capacity.

It also relates to a process for producing such a composition, as well as to the use of the latter, especially in the field of catalysis.

It is known that cerium oxide has the remarkable property of rapidly changing the oxidation state depending on the atmosphere in which it is found, which confers on this product a significant buffering power with respect to oxygen. Thus, cerium oxide can capture oxygen under oxidizing conditions and release it under reducing conditions, according to the following reversible and balanced mechanism:

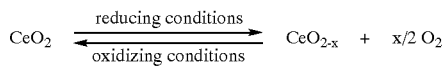

This particularly advantageous property of cerium oxide makes this product today one of the essential constituents of so-called multi-functional catalysts, especially those intended for the treatment of exhaust gases from internal combustion engines. Multi-functional means the catalysts capable of carrying out not only oxidation, in particular of carbon monoxide and of hydrocarbons present in exhaust gases, but also reduction, in particular of nitrogen oxides which are also present in these gases ("three-way" catalysts). Such catalysts, both as regards their compositions and their operating principle, have already been widely described in the literature and have formed the subject of many patents and/or patent applications. Taking into account the fact that the buffering effect of cerium oxide (property which is also commonly identified under the term of oxygen storage capacity) promotes the treatment and control of various conditions which are to be respected, especially at the level of oxygen contents and of oxygen diffusion, in order correctly to carry out each of the oxidation and reduction reactions mentioned above, the catalysts containing cerium oxide have proved overall more efficient than those which are free thereof.

However, considering the increasingly severe anti-pollution standards which are today imposed in the majority of countries with a view to reducing gaseous emissions judged harmful for the environment, and in particular in the field of automobile postcombustion, there currently is revealed a strong need in the state of the art regarding being able to have available ceric oxides which show higher oxygen storage capacity performances.

The present invention is targeted at satisfying such a need.

Following significant research carried out on the question, the Applicant has found that it were possible to obtain ceric oxides showing an improved oxygen storage capacity, and therefore particularly useful in the field of catalysis, by combining ceric oxide with certain specific additives.

More precisely still, there is now proposed, and that is the first subject of the present invention, a new composition based on ceric oxide having an improved oxygen storage capacity, the said composition being characterized in that it contains ceric oxide and at least one oxide of another metallic element M chosen from the group consisting of iron, bismuth, nickel, tin and chromium or one of their mixtures.

In the account which follows of the present invention, specific surface means the B.E.T. specific surface determined by nitrogen adsorption in accordance with ASTM D 3663-78 standard established from the Brunauer-Emmett-Teller method described in the periodical "The Journal of the American Society, 60, 309 (1938)". Moreover, in this description, the terms "compositions based on ceric oxide", or more simply still "ceric oxide", "containing", "promoted by", "doped by" or "treated with" an element M, are used without distinction in this description to define and denote the same product which is the subject of the present invention.

The improvement in the oxygen storage capacity of the compositions according to the invention was, for its part, revealed according to the test as given in the examples below.

In accordance with the invention, the promotion of the oxygen storage capacity of ceric oxide is thus provided by a metallic element M such as defined above, this element being in the oxide form.

According to a preferred characteristic of the compositions according to the invention, the doping element M is chosen, alone or as a mixture, from iron, bismuth and nickel.

The compositions doped both with iron and with nickel being shown to give the best results, they here constitute the most advantageous embodiment of the present invention.

The presence of the doping element in the compositions according to the invention can be revealed by simple chemical analyses, whereas conventional X-ray diffraction analyses show the form under which this presence exists.

It will be noted that the oxide of the metallic element M can thus be present in different forms in the compositions.

However, according to a particularly preferred embodiment of the compositions according to the invention, the doping element(s) M are introduced so that their oxides form, with the cerium oxide, at the surface of or within the latter, combinations of essentially solid solution or mixed oxide type. In this case, the doping element is then irreversibly bonded to the ceric oxide, in the sense that, for example, simple physical treatments, such as especially washes, even very forceful, do not make it possible to remove it. Additionally, still in this case, the X-ray diffraction spectra of these compositions reveal, in the latter, only the existence of a single clearly identifiable phase, which in fact corresponds to that of a ceric oxide whose unit cell parameters may or may not be more or less offset with respect to a pure ceric oxide.

The amounts of doping element to be used to obtain the desired promotion effect in the compositions according to the invention can vary within wide limits, which depend both on the extent of the desired improvement in the oxygen storage capacity but also on the form under which the oxide of this element can in practice exist when it is combined with the cerium oxide (especially solubility limit).

Generally, and whatever the composition studied, it is noted that very small amounts of doping elements are sufficient to increase, in an already substantial way, the oxygen storage capacity of ceric oxide, and that the promotion effect is no longer significantly improved from a limit quantity (threshold effect) beyond which more extensive doping becomes in itself of no advantage.

In practice, the compositions according to the invention thus contain, besides ceric oxide, an oxide of the above-mentioned metal element(s) M in an amount which can represent from 1 to 50 atom % of atoms of metal M with respect to the cerium atoms, and more particularly from 1 to 20 atom %. Preferably, this amount is chosen between 1 and 10 atom %, and still more advantageously between 1 and 5 atom %.

The compositions according to the invention finally have a specific surface of at least 10 m$^2$/g, preferably greater than 80 m$^2$/g and more advantageously still between 80 and 300 m$^2$/g. In particular, this specific surface is always at least 10 m$^2$g after a calcination carried out at 800° C.

The process for synthesis of new compositions based on ceric oxide according to the invention will now be enlarged upon. This process constitutes a second subject of the present invention.

The process according to the invention consists, in its essential stages, in first of all preparing an intimate mixture between (i) a ceric oxide or a ceric hydroxide, and (ii) at least one additive consisting of a hydroxide or a salt, thermally decomposable to an oxide, of the abovementioned metal promoter(s) M, the said mixing being carried out in the required stoichiometric proportions, and in then calcining this mixture so as to obtain a composition based on oxides in accordance with the invention.

It will be already noted that, in the above process, the use of a ceric oxide is suitable for the case where the compositions according to the invention are prepared from a ceric oxide which is already itself synthesized, the method for producing the intimate mixture then resting on an impregnation of the said oxide by an oxide precursor salt at calcination. Additionally, and as will be explained in more detail subsequently, the ceric hydroxide route is, for its part, reserved for the specific case where it is desired to prepare these compositions according to a technique perfectly integrated with an already existing process for elaborating ceric oxide and which rests on the calcination of a precursor hydroxide; in this case, intimate mixing between ceric hydroxide and the salt or hydroxide of the doping element can be obtained either by simple addition of the said salt at one of the stages of the preparation of the said ceric hydroxide or according to the technique known as coprecipitation of hydroxides.

The first embodiment mentioned above (impregnation) for the preparation of the compositions according to the invention thus leaves out the use of a ceric oxide. The ceric oxides which can be used in the invention are products which are already well known in themselves and they have been widely described in the literature, especially in many patents or patent applications. They are also commercially available. They can be prepared, especially by heating a ceric hydroxide or certain oxygen-containing salts such as nitrates, sulphates, carbonates, oxalates or acetates in air between 400 and 1000° C. (cf. Paul Pascal, "Nouveau Traité de Chimie Minérale [New Treatise on Inorganic Chemistry]", Volume VII, p. 777 (1959)), it being possible for ceric hydroxide to be provided in the form of precipitates or of colloidal suspensions. The ceric oxides used have a specific surface of at least 10 m$^2$/g, preferably greater than 80 m$^2$/g and more advantageously still between 80 and 300 m$^2$/g. It can be advantageous, in certain applications, to formulate them by carrying out an agglomeration of the particles constituting them according to well-known techniques of extrusion or of pressure pelleting, for example.

As shown above, mixing is then carried out by impregnation of the ceric oxide with a solution of at least one soluble salt of the abovementioned metals M, a salt which must be thermally decomposable to an oxide and which will be designated simply as oxide precursor. As suitable oxide precursors of these metals M, there may be mentioned, for example, nitrates, chlorides, sulphates or acetates. Nitrates constitute the preferred precursors.

According to a preferred variant of this first embodiment of the process according to the invention, the impregnation is carried out "dry", that is to say that the total volume of solution used is approximately equal to the total pore volume developed by the ceric oxide. As regards the determination of this pore volume, it can be carried out according to the known method with a mercury porosimeter or else by measuring the amount of water absorbed by a sample.

It is, however, also possible to impregnate the substrate by steeping the latter in the solution of the oxide precursor of the element M and to remove the excess solution by draining.

In a second stage, impregnated ceric oxide is dried to remove the water, thus leaving the oxide precursors in a form dispersed homogeneously and intimately in, or at the surface of, the ceric oxide. Drying is most often carried out in air, at a temperature which can vary between 80 and 300° C. and preferably chosen between 100 and 150° C. Drying is continued until a constant weight is obtained. Generally, drying lasts between 1 and 24 hours.

Finally, in a third stage, impregnated ceric oxide is calcined at a temperature generally between 400 and 1200° C. and preferably between 600 and 1000° C. This calcinating temperature must be sufficient to convert the precursors to oxides and it is also chosen depending on the subsequent temperature of use of the promoted ceric oxide. The duration of calcination can, for its part, vary within wide limits, for example between 1 and 24 hours, preferably between 4 and 10 hours.

As a result of this calcination, a ceric oxide is recovered combined with one or a number of the abovementioned metallic element M oxides, the said ceric oxide then having an improved oxygen storage capacity with respect to the starting ceric oxide.

As underlined previously in the description, it is also possible to prepare the compositions according to the invention by other routes which consist in introducing the metallic element M, always in the form of its oxide precursor, during the actual development of a ceric oxide, this development nevertheless having to be restricted to those of the type involving the prior formation of a ceric hydroxide and then the calcination of this precursor hydroxide to ceric oxide. The addition during the actual synthesis of ceric oxide is preferred to the impregnation route because it makes possible a more homogeneous distribution of the doping cation and thus a better incorporation in the CeO$_2$ matrix. This way of operating constitutes a second embodiment of the preparation process according to the invention. Of course, the choice of the moment and of the stage during which the oxide precursor of the element M can be introduced depends, on the one hand, on the nature of this precursor and, on the other hand, on the actual conditions of manufacture of the ceric oxide. In this respect, it will be noted that any process known in itself for the synthesis of a ceric oxide via a hydroxide route is, a priori, capable of being suitable for the implementation of the process according to the invention.

In order to illustrate more clearly the above remarks, various variants of a particularly preferred method of manufacture of the compositions according to the invention by a hydroxide route will now be enlarged upon.

In accordance with this preferred method of manufacture, the compositions according to the invention are prepared according to a process characterized in that, on the one hand, it comprises the following stages:

(i) a colloidal dispersion of a cerium(IV) compound is prepared by reacting an aqueous solution of a cerium (IV) salt and a base such that a degree of neutralization r is obtained which is strictly greater than 0 and strictly less than 4.

(ii) the said colloidal dispersion is optionally subjected to a heat treatment (thermohydrolysis stage)

(iii) the said dispersion is heated, optionally in the presence of a decomposable base, in a closed enclosure to a temperature and a pressure less than the critical temperature and the critical pressure respectively of the medium (stage also called autoclaving)

(iv) the reaction medium is cooled and brought back to atmospheric pressure (v) the ceric hydroxide precipitate thus formed is recovered (vi) and is then calcined to convert it to ceric oxide, and in that, on the other hand, at least one oxide precursor salt of the metallic element M is added to any one of Stages (i) to (v) above.

The above process makes it possible, among other advantages, to produce compositions according to the invention which have high specific surfaces, even after very high calcination temperatures.

Colloidal dispersion of a cerium(IV) compound means a colloidal dispersion of a ceric hydroxide or hydrated ceric oxide $CeO_2 \cdot 2H_2O$, which can contain residual amounts of bonded or absorbed ions, such as, for example, nitrate or ammonium. Examples of such colloidal dispersions are given in European Patent Applications EP-A-0,206,906 and EP-A-0,208,580.

As shown above, the preparation of the said colloidal dispersion is carried out by reacting an aqueous solution of a cerium(IV) salt with a base, under the conditions defined in more detail below.

An amount of base is used which must be less than the amount of base required for the complete neutralization of the cerium(IV) present in the reaction medium to produce $Ce(OH)_4$. It results therefrom that the cerium(IV) is obtained not in the form of a gelatinous precipitate but in the form of colloids, which means that particles of colloidal size are present.

Depending on the preparation conditions of the said dispersion, the cerium(IV) can be entirely in the form of colloids. It is also possible that the cerium(IV) is simultaneously in the form of ions and in the form of colloids. In order to simplify the account, "colloidal dispersion" means both a purely colloidal dispersion and an ion/colloid mixture: these will be clarified better subsequently.

As solutions of cerium(IV) salts, resort can especially be made to an aqueous ceric nitrate solution or an aqueous ceric ammonium nitrate solution. The said solution can contain, without disadvantage, cerium in the cerous state but it is desirable that it contains at least 85% of cerium(IV).

The concentration of the cerium salt solution is not a critical factor and can thus vary between 0.1 and 2 mol/liter, preferably between 1 and 2 mol/liter: the said concentration being expressed as cerium(IV). The aqueous cerium(IV) salt solution generally has a certain initial acidity and can thus have a normality which varies between 0.1 and 4 N, and preferably between 0.1 and 1 N.

The ceric nitrate solution can be obtained by reacting nitric acid with a hydrated ceric oxide prepared conventionally by reaction of a solution of a cerous salt, for example cerous carbonate, and an aqueous ammonia solution in the presence of hydrogen peroxide. Preferably, the ceric nitrate solution obtained according to the electrolytic oxidation process of a cerous nitrate solution, as described in French Patent Application FR-A-2,570,087, is used, which here constitutes a starting material of choice.

As regards the base used, resort can be made to an aqueous ammonia solution, an aqueous sodium hydroxide solution or an aqueous potassium hydroxide solution. Resort can also be made to gaseous ammonia. An aqueous ammonia solution is preferably used. The normality of the basic solution is not a critical factor and can vary between 0.1 N and 11 N, preferably between 0.1 N and 5 N.

The proportion between the basic solution and the cerium (IV) salt solution must be such that the degree of neutralization is greater than 0 and less than 4, these two terminals being excluded. The degree of neutralization r is defined by the following equation:

$$r = \frac{n3 - n2}{n1}$$

in which:

n1 represents the number of moles of Ce(IV) present in the final colloidal dispersion n2 represents the number of moles of OH⁻ necessary to neutralize the acidity introduced by the initial aqueous cerium(IV) salt solution n3 represents the total number of moles of OH⁻ introduced by the addition of the base.

The degree of neutralization reflects the colloidal state of the cerium(IV):

with r=4, cerium(IV) precipitates in the gelatinous form with r=0, cerium(IV) is in the ionic form with 0<r<4, cerium(IV) is in the more or less ionic and/or colloidal form.

When the degree of neutralization is high, that is to say greater than or equal to approximately 3, the cerium(IV) in the colloidal dispersion obtained is essentially in the form of colloids. When this degree is less than approximately 3, the degree of cerium(IV) in the colloidal form is generally between 10 and 90% of the cerium(IV) used.

The reaction between the aqueous cerium(IV) salt solution and the base used in the amounts defined above is carried out at a temperature which can lie between 0° C. and 60° C. but preferably at room temperature, i.e. most often between 15 and 25° C. The abovementioned reactants can be mixed according to several variants. For example, mixing can be carried out simultaneously, with stirring of the aqueous cerium(IV) salt solution and the basic solution or else the base can be added, continuously or on a single occasion, to the aqueous cerium(IV) salt solution, or vice versa.

The duration of mixing can vary between 0.1 second and 30 hours and is preferably chosen between 2 hours and 6 hours.

Whatever the order of introduction of the reactants, a colloidal dispersion of a cerium(IV) compound in aqueous medium is obtained, which can then be used in the continuation of the process according to the invention. This dispersion has a cerium(IV) concentration, expressed as $CeO_2$, which can vary between 0.1 and 2 mol/liter, preferably from 0.1 to 1 mol/liter.

The mean hydrodynamic diameter of the colloids, which is determined by quasi-elastic diffusion of light according to the method described by Michael L. McConnell in "Analytical Chemistry 53, No. 8, 1007 A (1981)", can vary between 4 nm and 40 nm.

In a second stage of the process according to the invention (Stage (ii)), which is not obligatory but simply preferred, the dispersion as obtained above can then be subjected to a heat treatment at a temperature between 80 and 300° C., preferably between 90° C. and 110° C., and more preferentially still at the reflux temperature of the reaction mixture.

The conditions of this heat treatment, also called thermohydrolysis, are not critical: it can be carried out at atmospheric pressure or under pressure, such as, for example, the saturated steam pressure corresponding to the temperature of the heat treatment. The treatment is carried out either under an air atmosphere or under an inert gas, preferably nitrogen, atmosphere.

The duration of this treatment can vary within wide limits, for example between 2 and 48 hours, preferably between 2 and 24 hours.

At the end of the operation, a solid precipitate is recovered which is separated by conventional solid/liquid separation techniques: filtering, settling, draining or centrifuging.

The product thus recovered is then subjected to washings, which are preferably carried out with an aqueous ammonia solution, and then resuspended in order to constitute the colloidal dispersion intended to be subjected to the autoclaving stage which will now be enlarged upon.

In accordance with the process according to the invention, the colloidal ceric hydroxide dispersion is then subjected (Stage (iii)) to an autoclaving treatment, before the calcination operation is carried out.

This autoclaving operation is carried out at a temperature between the reflux temperature and the critical temperature of the reaction medium. Preferably, the temperature is chosen between 100° C. and 350° C., and more preferentially still between 150° C. and 350° C. The temperature rise is carried out at a rate which is not critical. The reaction temperature is obtained by heating, for example, between 30 minutes and 4 hours.

This stage can be carried out by introducing the aqueous ceric hydroxide suspension into a closed enclosure (closed reactor), the pressure necessary for the treatment then resulting only from the heating alone of the reaction medium (autogenous pressure). Under the temperature conditions given above, and in aqueous medium, it can be specified, as illustrative, that the pressure in the reactor varies between a value greater than 1 bar ($10^5$ Pa) and 165 bar ($165 \cdot 10^5$ Pa), preferably between 5 bar ($5 \cdot 10^5$ Pa) and 165 bar ($165 \cdot 10^5$ Pa).

It is also possible to exert an external pressure which is then added to that resulting from the heating. The duration of the autoclaving operation is not critical. It can thus vary between 30 minutes and 6 hours.

At the end of the latter, cooling is left to take place at the inertia of the system and the system is brought back to atmospheric pressure.

The product suspended in the liquid medium is separated using conventional solid/liquid separation techniques such as settling, draining, filtering and/or centrifuging, for example.

According to a specific implementational variant of the autoclaving stage described above, a decomposable base is introduced into the colloidal ceric oxide suspension to be autoclaved. Decomposable base means a compound having a $pK_b$ of less than 7 and capable of decomposing under the subsequent calcination conditions of the process according to the invention. As illustrative of the latter, there may be mentioned aqueous ammonia, urea, ammonium acetate, ammonium hydrogencarbonate, ammonium carbonate or a primary, secondary or tertiary amine such as, for example, methylamine, ethylamine, propylamine, n-butylamine, sec-butylamine, n-pentylamine, 2-aminopentane, 2-amino-2-methylbutane, 1-amino-3-methylbutane, 1,2-diaminoethane, 1,2-diaminopropane, 1,3-diaminopropane, 1,4-diaminobutane, 1,5-diaminopentane, 1,6-diaminohexane, dimethylamine, diethylamine, trimethylamine, triethylamine or a quaternary amine such as, for example, a tetraalkylammonium hydroxide preferably having alkyl radicals containing from 1 to 4 carbon atoms, and resort is more particularly made to tetramethylammonium hydroxide or tetraethylammonium hydroxide. Very obviously, a mixture of bases can also be used. As base, resort is preferably made to an aqueous ammonia solution, a tetraalkylammonium hydroxide solution or their mixtures.

The concentration of base in the liquid autoclaving medium is not critical and it can vary within wide limits, for example between 0.1 N and 11 N and preferably between 1 and 10 N.

It will be noted that the way of obtaining the suspension to be autoclaved, and in particular the way of introducing the various reactants intended to constitute it (water, ceric hydroxide, decomposable base, optionally the oxide precursor salt of the element M when it is desired to introduce it at this stage); is entirely immaterial.

In accordance with this preferred embodiment of the process of synthesis according to the invention, the precursor salt(s) of the oxide of the doping element(s) M can be introduced at any one of Stages (i) to (v) of the manufacturing process given above. They can thus be introduced at the stage of formation of the sol, at the thermohydrolysis state (when it is used) or on the product resulting from this thermohydrolysis stage, before or after washing the latter, or else even at the autoclaving stage or on the product resulting from this autoclaving stage.

Preferably, the addition of the doping element M to the colloidal dispersion is carried out just before the autoclaving operation carried out on the latter.

The amounts of salt of the doping element(s) M used are such that the desired percentages by weight in the final composition are obtained.

The oxide precursor salts which can be used are those already mentioned above in the description, namely especially nitrates, chlorides, sulphates and acetates. They can here be used either in the form of aqueous solutions or in the solid form.

In the last stage of the process according to the invention (Stage (vi)), the composition resulting from the autoclaving stage is then calcined. As underlined in the case of the first embodiment of the process of synthesis of the compositions according to the invention, this calcination must be sufficient to entirely convert all the precursors (salts and/or hydroxides) to oxides, and it is also chosen according to the temperature of subsequent use intended for the promoted ceric oxide, taking into account the fact that the specific surface of the product becomes smaller as the calcinating temperature becomes higher. The latter can thus be between 400 and 1200° C., preferably between between 600 and 1000° C.

The doped ceric oxide obtained by the route which has just been enlarged upon has the advantage, besides the fact of having a high oxygen storage capacity, of having high specific surfaces after calcinations carried out both at low temperatures and at high temperatures.

The applications of the compostions based on ceric oxide according to the invention, which have been prepared by one or the other of the routes which have been enlarged upon above in the description, are very numerous. Their improved oxygen storage capacity makes them particularly well suited to being used in the field of catalysis, as catalysts and/or as catalyst supports. They can be employed as catalysts or catalyst supports for carrying out various reactions such as, for example, dehydration, hydrosulphurization, hydrodenitrification, desulphurization, hydrodesulphurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation or the shift conversion.

However, one of the most important applications is, of course, the use as a component for a catalyst for treating exhaust gases from internal combustion engines. Thus, in this application, the promoted ceric oxide according to the invention is mixed with alumina before or after impregnation by catalytically active elements, such as precious metals. This mixture is then either shaped to form catalysts, for example in the form of beads, or used to form a coating of a refractory body, such as a ceramic or metallic monolith, this coating generally being known under the name of "wash-coat".

The examples which follow illustrate the invention without, however, limiting it. In these examples, the metallic elements are determined by plasma emission spectrometry. The starting point will be to define the test used for determining the oxygen storage capacities.

DETERMINATION OF THE OXYGEN STORAGE CAPACITIES

In order to appreciate the advantage introduced by the compositions according to the invention, their oxygen storage capacity was determined according to the following test:

a specific mass of composition (either 0.1 g when this composition was calcined at 800° C. during its synthesis or 0.3 g if it was calcined at 1000° C.) is subjected to a gas flow consisting of helium under 2 bar and at a flow rate of 10 l/h.

Either carbon monoxide (CO), at a concentration of 5%, or oxygen, at a concentration of 2.5%, is injected in the pulse form into this carrier gas.

The test is carried out according to the following sequence:

temperature rise to 400° C. under helium sending a series of oxygen pulses sending a series of CO pulses sending a new series of $O_2$ pulses sending alternate CO and $O_2$ pulses To determine and assess the storage capacity, the mean consumption of CO (in ml) per gram of $CeO_2$, during the last series consisting of alternate CO and $O_2$ pulses, is then measured.

REFERENCE EXAMPLES 1 AND 2

Two control ceric oxides are prepared in the following way:

An aqueous colloidal dispersion of a cerium(IV) compound at a concentration equal to 60 g/l (expressed as $CeO_2$) is first of all obtained by reacting, at room temperature, (i) 1000 cm³ of a ceric nitrate solution containing 1.24 mol/liter of cerium(IV) and having a free acidity of 0.332 N with (ii) 2555 cm³ of a 0.3726 N aqueous ammonia solution introduced at a rate of 1664 cm³/hour into the ceric nitrate solution (degree of neutralization r=0.5). This dispersion is then subjected to a heat treatment at 100° C. for 4 hours (thermohydrolysis).

A precipitate is thus recovered by filtration which is then washed with an aqueous ammonia solution.

The washed product is resuspended in 1 liter of water and the resulting suspension is placed in a 2-liter autoclave. The assembly is then brought to 200° C., the autogenous pressure generated then being approximately 16 bar ($16 \cdot 10^5$ Pa), these conditions being maintained for 1 hour.

At the end of this treatment, the precipitate is filtered on a Buchner funnel.

Two fractions of the recovered product are then subjected to a calcination operation, under the following conditions respectively: 6 hours at 800° C. or 6 hours at 1000° C.

The oxygen storage capacity and specific surface values of the ceric oxides obtained are reported in Table I below:

TABLE I

| EXAMPLE | CALCINATION TEMPERATURE (° C.) | ADDITIVE (M) | CONTENT IN ATOM % (M/Ce) | ALTERNATE CONSUMPTION IN ml CO/g $CeO_2$ | SPECIFIC SURFACE ($m^2/g$) |
|---|---|---|---|---|---|
| 1 (Control) | 800 | — | — | 3.0 | 45 |
| 2 (Control) | 1000 | — | — | 1.1 | 16 |

EXAMPLES 3 TO 16

These examples illustrate the invention in the context of doping via an impregnation route.

A ceric oxide with a specific surface of 240 m²/g is prepared by strictly following the procedure of Example 1, with the sole difference that the final calcination stage is carried out at 400° C. for 6 hours. The pore volume of the oxide obtained is 0.29 cm³/g. This ceric oxide is then impregnated with nitrate solutions of various doping elements M, with the amounts necessary to produce the desired content in the final composition, after calcination. In this series of tests, the content was fixed at 2.5 atom % (M/Ce). This impregnation is carried out by the method called "dry impregnation", that is to say the volume of impregnation solution is approximately equal to the pore volume of the solid to be impregnated.

The impregnated product is then dried under air at 140° C. and then separated into two fractions, each of these fractions being calcined under the conditions given in Example 1.

A control test is also carried out (Examples 12 and 13) under the same conditions but replacing the impregnation solution with pure water.

The oxygen storage capacities and the specific surfaces of the compositions thus obtained (doped ceric oxides) after calcination at 800° C. (6 hours) and 1000° C. (6 hours) are collated in Table II below:

TABLE II

| EXAMPLE | CALCINATION TEMPERATURE (° C.) | ADDITIVE (M) | CONTENT IN ATOM % (M/Ce) | ALTERNATE CONSUMPTION IN ml CO/g CeO$_2$ | SPECIFIC SURFACE (m$^2$/g) |
|---|---|---|---|---|---|
| 3 | 800 | Fe | 2.5 | 4 | 30 |
| 4 | 1000 | Fe | 2.5 | 1.4 | 7 |
| 5 | 800 | Cr | 2.5 | 3.5 | 12 |
| 6 | 1000 | Cr | 2.5 | 1.2 | 4 |
| 7 | 800 | Sn | 2.5 | nd* | 14 |
| 8 | 1000 | Sn | 2.5 | 1.5 | 10 |
| 9 | 800 | Bi | 2.5 | 4.2 | 29 |
| 10 | 1000 | Bi | 2.5 | 3.3 | 6 |
| 11 | 800 | Ni | 2.5 | 9.6 | 12 |
| 12 | 1000 | Ni | 2.5 | 3.3 | 4 |
| 13 | 800 | Fe + Ni | 1.25 + 1.25 | 7.2 | 31 |
| 14 | 1000 | Fe + Ni | 1.25 + 1.25 | 2.6 | 8 |
| 15 (Control) | 800 | — | — | 2.9 | 42 |
| 16 (Control) | 1000 | — | — | 1 | 16 | nd* = not determined

EXAMPLES 17 TO 22

These examples illustrate the invention in the context of doping carried out during the actual synthesis of a ceric oxide.

Example 1 is thus reproduced, with this mere difference that, just before the autoclaving stage, doping elements M, in the form of nitrate salts, are introduced into the suspension to be autoclaved in the amounts necessary to produce the desired content in the final composition, after calcination.

The oxygen storage capacities and the specific surfaces of the compositions thus obtained (doped ceric oxides) after calcination at 800° C. (6 hours) and at 1000° C. (6 hours) are collated in Table III below:

TABLE III

| EXAMPLE | CALCINATION TEMPERATURE (° C.) | ADDITIVE (M) | CONTENT IN ATOM % (M/Ce) | ALTERNATE CONSUMPTION IN ml CO/g CeO$_2$ | SPECIFIC SURFACE (m$^2$/g) |
|---|---|---|---|---|---|
| 17 | 800 | Fe | 2.2 | 4.7 | 31 |
| 18 | 1000 | Fe | 2.2 | 1.8 | 4.6 |
| 19 | 800 | Fe | 9.3 | 4.3 | 35 |
| 20 | 1000 | Fe | 9.3 | 2.2 | 8 |
| 21 | 800 | Bi | 2.1 | 4.9 | 40 |
| 22 | 1000 | Bi | 2.1 | 3.1 | 5.6 |

We claim:

1. An oxygen storage capacity ceric oxide composition, comprising; a solid solution of metal oxides comprising cerium, bismuth and chromium atoms, wherein the mole percent of chromium and bismuth is between 1 and 50.

2. The oxygen storage capacity ceric oxide composition of claim 1, wherein said oxygen storage capacity ceric oxide composition exhibits a single phase x-ray diffraction spectra.

3. The oxygen storage capacity ceric oxide composition of claim 1, said oxygen storage capacity ceric oxide composition further comprising nickel.

4. The oxygen storage capacity ceric oxide composition of claim 1, said oxygen storage capacity ceric oxide composition further comprising iron.

5. The oxygen storage capacity ceric oxide composition of claim 1, wherein said catalyst comprises an atomic ratio of said (b) at least one oxide of bismuth and chromium to said (a) at least one ceric oxide of between 1 and 50%.

6. The oxygen storage capacity ceric oxide composition of claim 5, wherein said ratio is between 1 and 20%.

7. The oxygen storage capacity ceric oxide composition of claim 5, wherein said ratio is between 1 and 10%.

8. The oxygen storage capacity ceric oxide composition of claim 5, wherein said ratio is between 1 and 5%.

9. The improved oxygen storage capacity ceric oxide composition of claim 1, wherein said (b) at least one oxide of bismuth and chromium forms, with said (a) at least one ceric oxide, a mixed oxide.

10. The oxygen storage capacity ceric oxide composition of claim 1, wherein said improved oxygen storage capacity ceric oxide composition exhibits an X-ray diffraction spectrum which corresponds to that of a monophasic product of CeO$_2$.

11. The oxygen storage capacity ceric oxide composition of claim 1, said catalyst having a specific surface of at least 10 m$^2$/g after calcination at 800° C.

12. The oxygen storage capacity ceric oxide composition of claim 1 further comprising, (iii) at least one porous support, wherein said (iii) at least one porous support comprises alumina.

13. A composition, comprising; a solid solution of metal oxides comprising cerium, iron and nickel atoms, wherein the mole percent of nickel is between 1 and 50.

14. A composition, comprising a solid solution of metal oxides comprising cerium and iron atoms.

15. A composition, comprising a solid solution of metal oxides comprising cerium and nickel atoms.

16. A composition comprising a solid solution of metal oxides comprising cerium atoms, tin atoms, and atoms from one or more metals selected from the group consisting of bismuth, chromium, iron and nickel.

17. A composition comprising a solid solution of metal oxides comprising cerium and bismuth atoms.

* * * * *